May 12, 1964
M. N. ANDERSON
3,133,141
ADJUSTABLE TEMPLE FOR EYEGLASSES
Filed Jan. 5, 1962
2 Sheets-Sheet 1
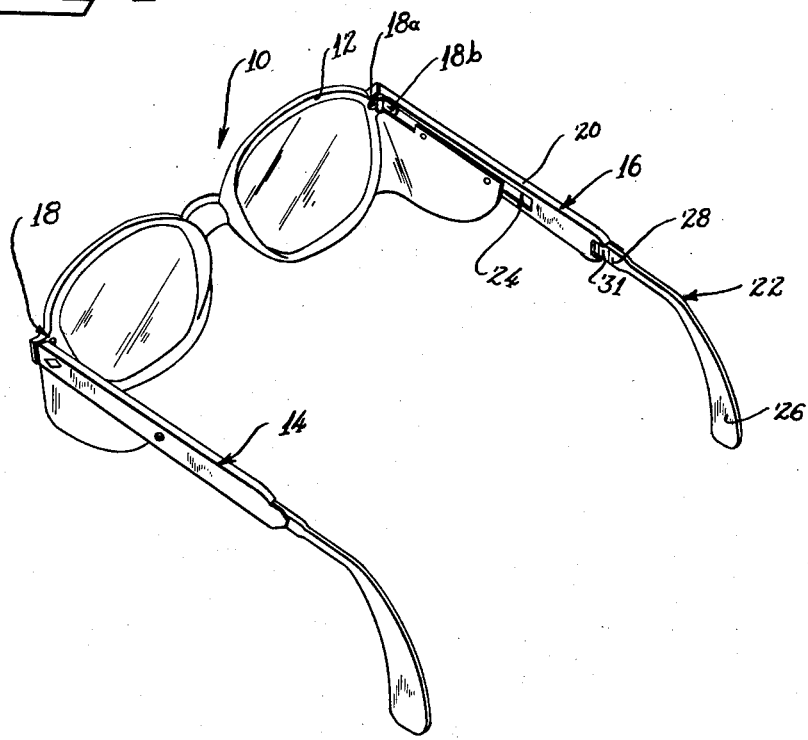
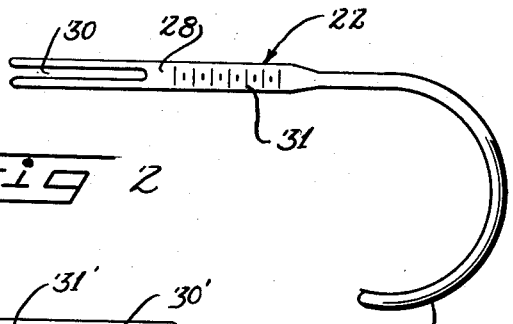
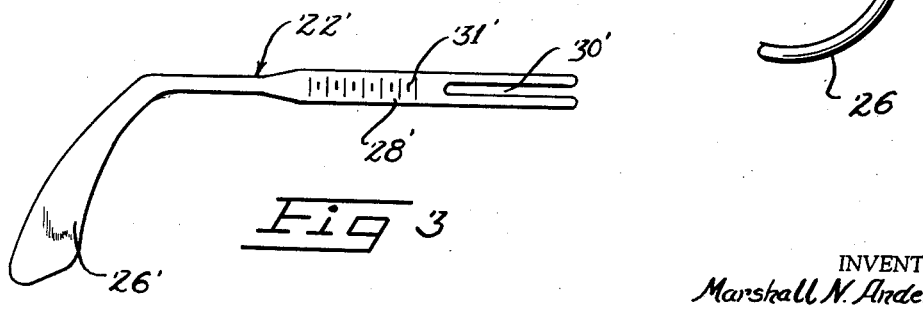
INVENTOR.
Marshall N. Anderson
BY
Olson, Mecklenburger, von Holst,
Pendleton & Neuman Attys

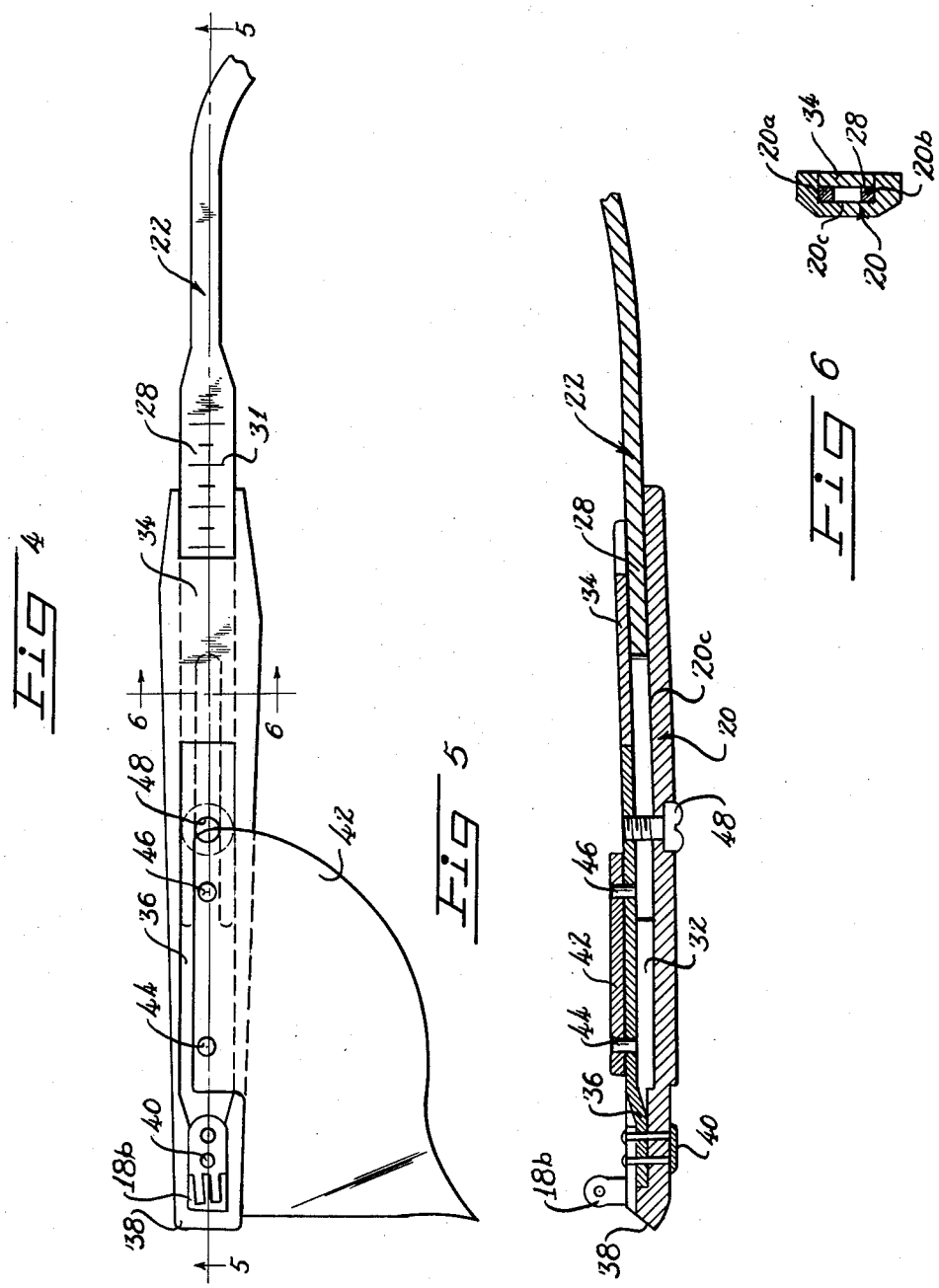

United States Patent Office 3,133,141
Patented May 12, 1964

3,133,141
ADJUSTABLE TEMPLE FOR EYEGLASSES
Marshall N. Anderson, Grayslake, Ill., assignor to Sellstrom Manufacturing Company, Palatine, Ill., a corporation of Illinois
Filed Jan. 5, 1962, Ser. No. 164,459
3 Claims. (Cl. 88—52)

This invention relates to an adjustable temple for a pair of eyeglasses; and although the invention will be described in connection with a pair of safety glasses or goggles, it is to be understood that many of the features of the invention may be applied to and used in connection with other types of glasses.

Safety glasses or goggles have become standard in industry and are generally provided to and required to be worn by those employees engaged in work which would normally be hazardous to the eyes. In plants where a substantial number of workers wear safety glasses, the management must ordinarily maintain in stock a number of glasses of different standard sizes, perhaps most of the glasses differing only in the length of the temples. Nevertheless, such stocks have heretofore been necessary in order to facilitate the immediate fitting of new employees and to permit quick replacement of glasses which are lost or broken by the workers.

Frequently, in addition to maintaining an inventory of glasses of several different sizes, a company will maintain a supply of various size glasses which have side shields and a separate assortment of sizes which do not have this side shield. Moreover, some workers find that they are more comfortable with a particular type of temple such as a cable type or spatula type; and, therefore, some companies may stock glasses having different types of temples. Such an inventory of glasses, particularly in a large company, represents a substantial investment, and attempts have been made to render the temples adjustable over the standard size range, so that the glasses may be adjusted to fit the particular worker.

However, most of the adjustable temple arrangements have not proved satisfactory for one reason or another, perhaps because they have been available only at a sacrifice of some of the desirable qualities of standard non-adjustable glasses. It is apparent that while the adjustable feature is extremely desirable, it should not result in a noticeable increase in bulk or weight, such that the glasses tend to become uncomfortable to the wearer, for it is axiomatic that the more comfortable the safety glasses, the easier the task of assuring that the workers will wear them. In addition, the glasses must be strong so that they will withstand the normal use given by the personnel, and they must be stable so that once adjusted they will not tend to wobble or come out of adjustment.

It is, therefore, an object of this invention to provide an adjustable temple for glasses which will be as comfortable, as strong and as stable as standard non-adjustable temples.

It is another object of this invention to provide an adjustable temple for a pair of eyeglasses which will have a removable ear-engaging tip and will eliminate the necessity for a large inventory of glasses with different sizes or types of temples.

It is another object of this invention to provide an adjustable temple which is economical to manufacture and weighs and looks substantially the same as standard non-adjustable temples.

It is a further object of this invention to provide a temple for a pair of eyeglasses which may be easily adjusted to any desired length for maximum comfort of the wearer, and once adjusted may be locked tightly in the desired position.

Other objects will be seen, and a further understanding of the invention will be had by referring to the following description and claims taken in conjunction with the accompanying drawings.

The temple constructed in accordance with this invention is especially adapted for use in connection with safety glasses or goggles, and in one embodiment of the invention the temple comprises an elongated first member or housing having a longitudinal guideway formed therein and carrying a means adjacent one end for effecting hinged attachment of the temple to the frame of the glasses. A second or end member which is adapted to engage the ear of the wearer has an elongated shank portion which is slidably mounted for longitudinally telescoping movement within the guideway of the first member, and manually adjustable clamping means is carried by the housing for clamping the shank of the end member in a desired position of relative adjustment with respect to said housing.

The clamping means preferably includes a clamping bar or plate which is attached to the housing adjacent the hinged end thereof and which extends along the housing guideway in spaced, substantially parallel relationship with respect to one wall thereof. It is into this space between the bar and the housing guideway wall that the elongated shank of the temple end member is adapted to slide. A threaded fastener extends transversely through the one wall of the housing guideway and engages the clamping bar. By means of this threaded fastener, the clamping bar may be drawn toward the one wall of the housing guideway to effect clamping of the end member shank portion therebetween.

The shank portion of the end member is preferably slotted to facilitate the sliding movement through the portion of the housing guideway traversed by the threaded fastener. In the preferred embodiment, the clamping bar is made of metal, and one portion of the hinge which interconnects the frame of the glasses and the temple housing is attached to the end of this bar. The temple end member also is preferably constructed of metal; and, thus, when clamped in the desired position of adjustment there is metal-to-metal contact from the hinged end of the housing to the ear-engaging tip of the temple end member, thereby providing the temple with maximum strength and durability. For maximum stability of the temple, that portion of the guideway not covered by the clamping bar is preferably covered by a web, thereby restricting transverse movement of that part of the second member shank portion not engaged by the clamping bar. Not only may the hinge be attached to the metal clamping bar, but the side shields which are frequently employed with safety glasses may also be easily attached to this bar by screws or rivets. If desired, suitable indicia may be provided on the shank of the second member so that adjustments can be made in accordance with the standard temple sizes.

Reference is now made to the drawings in which:

FIGURE 1 is a perspective view of a pair of safety glasses employing temples constructed in accordance with this invention;

FIG. 2 is a side elevation view of a cable type temple end member which may be employed in the temple of this invention;

FIG. 3 is a side elevation view of a spatula type temple end member which may be used interchangeably with the cable type temple end of FIG. 2 in the temple of this invention;

FIG. 4 is an enlarged side elevation view of a temple constructed in accordance with this invention;

FIG. 5 is a sectional view of the temple taken substantially along line 5—5 of FIG. 4; and FIG. 6 is a sectional view of the temple taken substantially along line 6—6 of FIG. 4.

With more particular reference to the drawings, in

FIG. 1 is illustrated a pair of safety glasses 10 which include a frame 12 and a pair of temples 14 and 16. The temples are each connected to the respective side corners of the frame 12 by means of standard barrel hinges 18, each barrel hinge including a pair of hinged sections 18a and 18b. The temples 14 and 16 are identically constructed, and each consists of a housing member 20, an ear-engaging end member 22 and a clamping means 24.

As best illustrated in FIG. 2, the end member 22 includes an ear-engaging tip portion 26 and an elongate shank 28. In the shank 28 there is formed an elongate longitudinally extending slot 30 which preferably extends to the end of the shank and, thus, in effect bifurcates the shank. Suitable size indicia 31 may be stamped on the shank 28 for facilitating adjustment of end member 22 with respect to the housing 20 in accordance with standard temple sizes, as will be more fully explained. In FIG. 2 the end member 22 has a cable type tip portion 26, whereas in FIG. 3 the end member 22' has a spatula type tip portion 26'. The shank 28' and slot 30' of the end member 22' are identical to the shank 28 and slot 30 of the end member 22, and the size indicia 31' on the shank 28' is identical to the size indicia 31 on shank 28. The ear-engaging tip portions 28 (or 28') may be dipped in vinyl plastic for decorative effect and for added comfort to the wearer.

The housing member 20 is preferably formed of plastic or other similar material such as is commonly used in the construction of temples for eyeglasses. Formed within the housing 20 is a substantially channel-shaped guideway 32 defined by a pair of side walls 20a and 20b and an intermediate or base wall 20c. See FIG. 6. The width of the guideway 32 is preferably just slightly greater than the width of the end member shank 28, and the length of the guideway is preferably at least equal to the length of the end member shank. The depth of the guideway 32 on the other hand is greater than the thickness of the shank 28.

Adjacent the free end of the housing 20, a web 34 extends across the guideway 32, the thickness of the web being such that the remaining depth of the guideway 32 will be just slightly greater than the thickness of the end member shank 28. The guideway 32 is thus adapted to slidably accommodate the shank of the end member 28, and the temple may be adjusted for length by adjusting the position of the shank within the guideway. The clamping means 24 is effective to lock the shank of the end member 22 or 22' in its desired position of adjustment within the guideway of the housing 20. This clamping means includes a resilient metal bar 36 which may be formed of aluminum, steel or other material having comparable strength and resilience. One end of the bar 36 is attached to the housing 20 adjacent the hinged end 38 thereof by means of a two-prong rivet 40, and the prongs of the rivet preferably extend not only through the bar 36 but also through the plate in the hinge portion 18b, thus, effecting a firm interconnection between the metal hinge portion 18b, the metal clamping bar 36 and the plastic housing 20. The bar 36 is cantilevered over the guideway 32 in spaced relationship with the base wall 20c of the housing guideway and the free end of this bar is preferably in closed proximity to the web 34 which extends across the guideway. The width of the clamping bar 36 is slightly less than the width of the guideway 32, and the bar is disposed within the guideway with its exterior surface approximately flush with the inner surface of the housing 20. The thickness of the clamping bar is such that the remaining depth of the guideway, i.e., the depth of the space between the bar and the guideway base wall 20c, is just slightly greater than the thickness of the end member shank 28. Thus, the shank is slidably accommodated within the guideway below plate 36 and web 34 and against the base wall 20c.

A side shield 42 may be secured to the bar 36 by means of rivets 44 and 46. If desired, for even greater versatility, the bar 36 may be drilled and tapped, and screws may be used to attach the side shield 42. Extending through the base wall 20c of the housing and traversing guideway 32 near the free end of the cantilevered clamping bar 36 is a screw 48, and the bar 36 is internally threaded so that the end of the screw 48 will engage therewith. By tightening the screw 48, the free end of the bar 36 may be drawn toward the base wall 20c of the housing, and the shank 28 of the end member 22 may be clamped tightly between the base wall and the bar.

The slot 30 or 30' in the end member shank 28 or 28' permits the shank to slide longitudinally within that portion of the guideway traversed by the screw 48. If the slot extends to the end of the shank to bifurcate the shank, as is the case in the illustrated embodiments, then the shank may not only be longitudinally adjusted relative to the housing but it may be completely withdrawn from the housing without removing the screw 48. If, on the other hand, the slot 30 or 30' were closed at the end, it would be necessary to remove the screw 48 before the shank could be withdrawn completely from the housing.

It will be noted that the clamping interengagement of the metal bar 36 and the metal end member 22 or 22' results in a metal-to-metal connection throughout the length of the temple from the hinge section 18b to the ear-engaging tip portion 26 or 26'. It will also be noted that the drawing downwardly of the free end of the cantilevered bar 36 results in frictional clamping action over a substantial area of the end member shank.

The close fit of the shank 28 or 28' within the channel-shaped guideway 32 minimizes lateral movement between the two members, and when clamped in position the housing 20 and the end member 22 or 22' form a very stable temple which is quite free from wobble. The web 34 which spans the guideway 32 at the free end of the housing 20 not only serves to guide the end member shank 28 or 28' during sliding adjustment, but after clamping this web acts as a stabilizing support for the shank externally of the clamping bar, a feature which is very desirable when the end member is in an extended position. The sliding telescoping interengagement of the housing and end member not only permits the temple to be adjusted for length, but it permits a number of different types and styles of ear-engaging tips 26 or 26' to be employed interchangeably. Because of the relatively few numbers of parts employed, the weight of the adjustable temple is substantially the same as that of temples of standard design.

The adjustable temple eliminates the necessity for maintaining large inventories of glasses with various size temples. The temple very closely resembles a standard temple and is not only comfortable and strong but it may be easily adjusted. The adjustment may be made by the wearer to suit his own comfort, or it may be made by persons who have little or no special training.

Although the invention has been described with a certain degree of particularity, it is understood that the present disclosure has been made only by way of example and that many modifications and changes in various details may be resorted to without departing from the spirit and scope of the invention, as hereinafter claimed.

What is claimed is:

1. An adjustable temple for the frame of a pair of eyeglasses, said temple comprising a first member having an elongate guideway formed therein, said first member having an inner and an outer end with means carried adjacent the inner end for hinged attachment of said first member to the eyeglass frame, a second member including an ear engaging portion and a shank portion, and manually adjustable clamping means including an elongate clamping plate and a threaded element, said clamping plate being attached to said first member adjacent the inner end thereof and extending longitudinally outwardly along said guideway in spaced substantially parallel relationship with respect to one wall of said guideway, said threaded element transversing a portion of said guideway and extending between said guideway one wall and said clamping plate and effective to forcibly draw said clamping plate towards said one wall, said second member shank portion being disposed within the guideway of said first member between said guideway wall and said clamping plate for longitudinal sliding adjustment therewithin without the removal of said threaded element, and said shank portion extending through and inwardly of the portion of said guideway transversed by said threaded element to provide contact between said clamping plate and said shank portion over an extended length when said plate is drawn toward said guideway one wall by said threaded element, whereby said shank portion may be clamped in the desired position of adjustment within said guideway.

2. The structure of claim 1 wherein said second member shank portion is slotted to facilitate sliding movement thereof within the portion of said first member guideway traversed by the threaded element of said clamping means.

3. In combination with a frame for a pair of eyeglasses, a temple and a hinge interconnecting the inner end of the temple to said frame, said temple comprising an elongate first member having a longitudinally extending substantially channel-shape guideway formed therein, a second member having an ear engaging portion and an elongate shank, an elongate resilient clamping plate attached to said first member adjacent one end thereof, said clamping plate being disposed within and cantilevered longitudinally along said guideway in spaced substantially parallel relationship with respect to one wall of said guideway, and a threaded element extending through the one wall of said guideway and into threaded engagement with said clamping plate, whereby said clamping plate may be drawn towards said one wall, said second member shank being disposed within the guideway of said first member between said guideway one wall and said clamping plate for sliding adjustment therewithin without removal of said threaded element, and said shank extending through and inwardly of a portion of said guideway transversed by said threaded element to provide contact between said clamping plate and said shank over an extended length when said plate is drawn toward said guideway one wall by said threaded element, whereby said shank may be clamped in the desired position of adjustment within said guideway.

References Cited in the file of this patent

UNITED STATES PATENTS

| | | |
|---|---|---|
| 1,245,884 | Day | Nov. 6, 1917 |
| 1,636,740 | Hickey | July 26, 1927 |
| 2,251,330 | Fairbank | Aug. 5, 1941 |
| 2,281,129 | Wolff | Apr. 28, 1942 |
| 2,412,076 | Bouchard | Dec. 3, 1946 |
| 2,432,676 | Peck et al. | Dec. 16, 1947 |
| 2,443,249 | Jackson | June 15, 1948 |
| 2,631,494 | Gunkel | Mar. 17, 1953 |
| 3,045,544 | Schmidt | July 24, 1962 |

FOREIGN PATENTS

| | | |
|---|---|---|
| 394,570 | Great Britain | June 29, 1933 |
| 703,645 | Germany | Mar. 13, 1941 |
| 802,302 | France | June 6, 1936 |
| 802,839 | Great Britain | Oct. 15, 1958 |